TORQUE TRANSMISSION BY INERTIA

Original Filed April 5, 1960 5 Sheets-Sheet 1

INVENTOR
HENDRIK CANCRINUS

BY Wenderoth, Lind & Ponack
ATTORNEY

TORQUE TRANSMISSION BY INERTIA

Original Filed April 5, 1960 5 Sheets-Sheet 2

INVENTOR
HENDRIK CANCRINUS

BY Wenderoth, Lind & Ponack
ATTORNEYS

TORQUE TRANSMISSION BY INERTIA

Original Filed April 5, 1960 5 Sheets-Sheet 3

INVENTOR
HENDRIK CANCRINUS

BY Wenderoth, Lind & Ponack
ATTORNEYS

TORQUE TRANSMISSION BY INERTIA

Original Filed April 5, 1960 5 Sheets-Sheet 4

INVENTOR
HENDRIK CANCRINUS

BY Winderoth, Lind & Ponack
ATTORNEYS

TORQUE TRANSMISSION BY INERTIA

Original Filed April 5, 1960 5 Sheets-Sheet 5

INVENTOR
HENDRIK CANCRINUS

BY Wendroth, Lind & Ponack
ATTORNEYS

United States Patent Office

Re. 26,507
Reissued Dec. 17, 1968

26,507

TORQUE TRANSMISSION BY INERTIA

Hendrik Cancrinus, Rondebosch, Cape Province, Republic of South Africa, assignor to Inpower Works (Proprietary) Limited, Windhoek, South-West Africa Original No. 3,077,793, dated Feb. 19, 1963, Ser. No. 20,047, Apr. 5, 1960. Application for reissue Nov. 10, 1966, Ser. No. 615,870
Claims priority, application Republic of South Africa Apr. 13, 1959
14 Claims. (Cl. 74—752)

Matter enclosed in heavy brackets [ ] appears in the original patent but forms no part of this reissue specification; matter printed in italics indicates the additions made by reissue.

This invention relates to apparatus for transmitting torque by inertia.

It is an object of this invention to provide apparatus for transmitting torque over a range of speeds, with flexibility.

According to the invention, a torque transmitter comprises a carrier, at least one planet wheel mounted in the carrier to rotate about its own axis, a drum around the carrier and coaxial with the carrier and a second axis, the carrier and drum being mounted to rotate about the second axis, drive connecting means connected to said carrier for connecting the carrier to a source of rotary power, a sun wheel coaxial with the second axis, connecting means connected to the sun wheel for connecting the sun wheel to a load to absorb rotary power, intermediate drive means drivingly connecting the planet wheel with the sun wheel and applying torque developed about the axis of said planet wheel in the same direction about the second axis, a plurality of liquid entrapping means fast with the planet wheel and defining recesses spaced circumferentially away from and around the planet wheel axis, whereby when a quantity of liquid is placed in the drum and said carrier and said drum are rotated, the liquid is flung out in an annular layer against the inner peripheral surface of the drum under the action of centrifugal force, and whereby when the planet wheel rotates about its axis, the liquid entrapping means pass through the annular layer of liquid and entrap liquid in the recesses and displace the entrapped liquid inwardly away from the periphery of the drum in a direction towards the second axis, and after displacement reject such displaced liquid under the action of centrifugal force in a direction outwardly towards the annular layer.

The invention may include one or more of the following features.

The intermediate drive means may include a chain engageable with sprockets comprising the planet wheel and sun wheel. Or if desired the planet wheel and sun wheel may be toothed gear wheels and the intermediate drive means may include an idler between the planet wheel and sun wheel and meshing with them both. Of course the same result as by a single idler may be obtained by equivalent means, such as an odd number of toothed gear idlers meshing in series and with the sun wheel on the one hand and with the planet wheel on the other hand. A plurality of planet wheels may be provided, symmetrically disposed for balance about the second axis.

One revolution of the carrier in a positive direction about the second axis when the sun wheel is stationary will cause the planet wheel to perform a positive revolution about its own axis and to have a negative arcuate displacement about its own axis dependent upon the relative numbers of teeth of the sun and planet wheels. If the ratio between the numbers of teeth is unity, then the negative arcuate displacement will be a full revolution and will cancel out the full positive revolution and in fact the planet wheel will then be not arcuately displaced at all about its own axis, and the arm of the eccentric mass about the planet wheel will then execute a motion which may be termed circular translation.

The mass may be connected to the planet wheel by an arm, the intermediate drive means connects planet and sun wheels and the connecting means connects sun wheel and output shaft.

Further features of the invention will become apparent from the claims and from the following description of specific embodiments of the invention with reference to the accompanying drawings.

Figure 1:
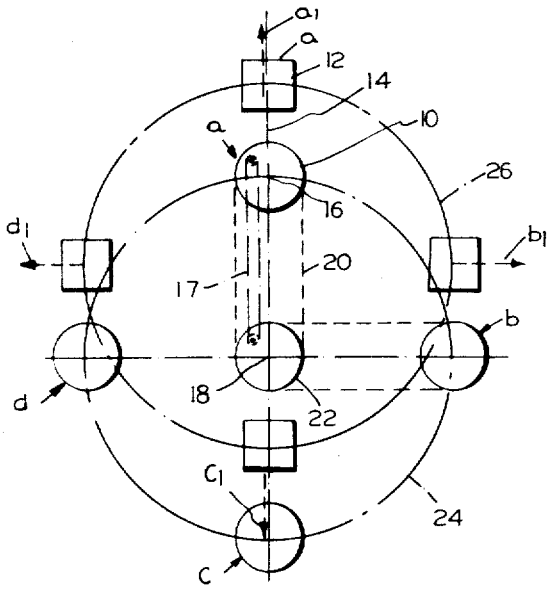
FIGURE 1 shows diagrammatically in end elevation a chain driven sun and planet wheel arrangement together with eccentric mass.

FIGURE 1 and the description in relation to it are merely given by way of explanation for a better understanding of the invention and no claim is directed to the construction there shown and described.

Referring to FIGURE 1, reference numeral 10 refers to a planet wheel having an eccentric mass 12 on an arm 14 and mounted to rotate about an axis 16 in a carrier not shown but which is mounted to rotate about a second axis 18 parallel to the first axis 16. An intermediate drive means which may be an idler gear, a connecting rod 17, or a chain, but which is shown in this figure for convenience to be a chain 20, drivingly connects planet wheel 10 with a sun wheel 22 provided coaxially with the second axis 18. In FIGURE 1 the planet wheel and mass are shown in four positions, namely positions (*a*), (*b*), (*c*) and (*d*) for the case where the planet wheel and the sun wheel have equal numbers of teeth. When a rotary power input is applied to the carrier, the planet wheel axis describes the circular locus 24 and while the sun wheel is stationary the planet wheel does not rotate about its axis, and the centre of gravity of the mass 12 will describe the circular orbits 26. In orbiting, the mass has centrifugal force directed away from the centre of orbit 26, as shown at *a*1, *b*1, *c*1 and *d*1. This centrifugal force when acting on an effective arm through the planet wheel axis develops a turning moment about that axis and this turning moment is transmitted through the intermediate drive means to the sun wheel 22. The turning moment has maximum values at positons (*b*) and (*d*) but in opposite senses, the turning moment at (*b*) being regarded for convenience as being positive, and the turning moment at (*d*) being regarded as negative. The turning moment on the planet wheel is zero at positons (*a*) and (*c*), because in these positions the centrifugal force is directly in line with the planet wheel about its axis, i.e. there is no effective arm, and therefore it can exert no moment on the planet wheel about its axis.

By employing a one way device, in the construction shown in FIGURE 1, positive torque pulses only may be carried over from the planet wheel onto an output shaft connected to the sun wheel 22. In accordance with the invention, however, instead of the solid mass 12, there is provided liquid retaining means 12*a* (see FIGURE 2) fast with the planet wheel and eccentric to its axis, adapted to receive and to retain liquid in some regions of its orbit and adapted to reject it in others. The effective mass is therefore variable in magnitude.

Figure 3:
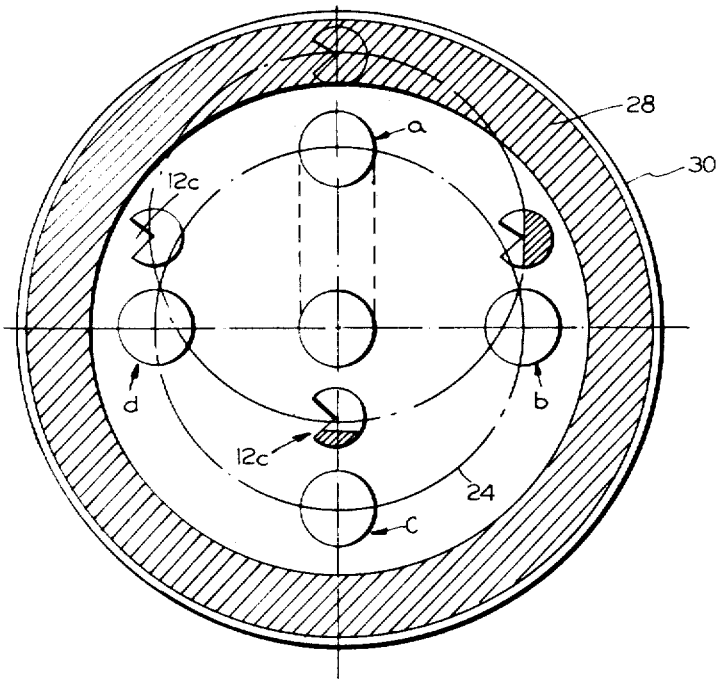
FIGURE 3 shows diagrammatically in end elevation the arrangement of FIGURE 2 within a drum containing liquid for charging the container.
Figure 2:
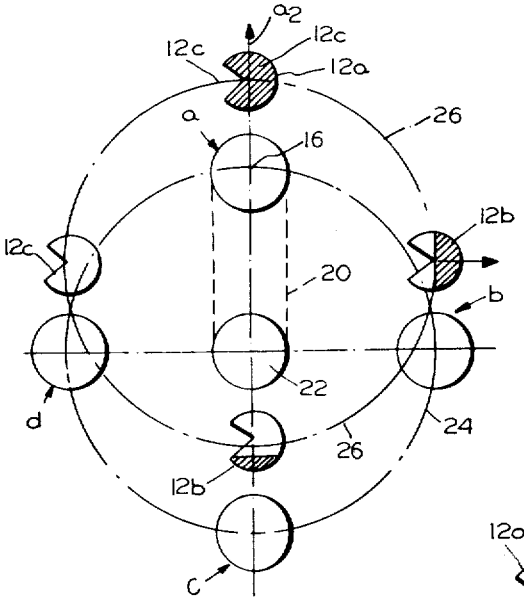
FIGURE 2 shows diagrammatically in end elevation a chain-driven sun and planet wheel arrangement, the eccentric mass being a liquid in a container.

Referring to FIGURE 2 it will be seen that an arrangement is provided similar to that shown in FIGURE 1 except that instead of solid mass 12, there is provided liquid retaining means in the form of a container 12*a* adapted to receive liquid and to reject it. The container is shown having an opening 12*c* through which the received liquid is adapted to enter and to be rejected. The openings are shown diagrammatically in the drawings as being of V-shape in end elevation but they may be of any suitable shape. Referring to FIGURE 3 the container is filled by allowing it to become immersed in a layer of liquid 28 disposed circumferentially within a drum 30 under the [section] *action* of centrifugal force due to the rotation of the liquid. As can be seen from FIGURE 3, the container 12*a* dips into the layer at position (*a*) where its orbit passes through the layer, then it is full of liquid at position (*b*), and it loses its liquid in the region of position (*c*). The mass therefore varies in magnitude from a maximum when the container 12*a* is full of liquid as shown at position (*b*), to a minimum when the container is empty as shown at the position (*d*). In position (*b*) the moment arm is at right angles to the centrifugal force on the mass thus giving the maximum effective torque. Conversely in position (*d*) there is no mass and consequently no centrifugal force and therefore no effective torque. In positions (*a*) and (*c*) there is no torque because the effective arm is zero. The directions of the centrifugal force on the liquid mass in the various positions are indicated by references *a*2, *b*2 and *c*2 in FIGURE 2. No reference *d*2 is shown because liquid was rejected completely from the container in travelling from the *c* to the *d* position, and hence as there is no mass there can be no centrifugal force.

Figure 4:
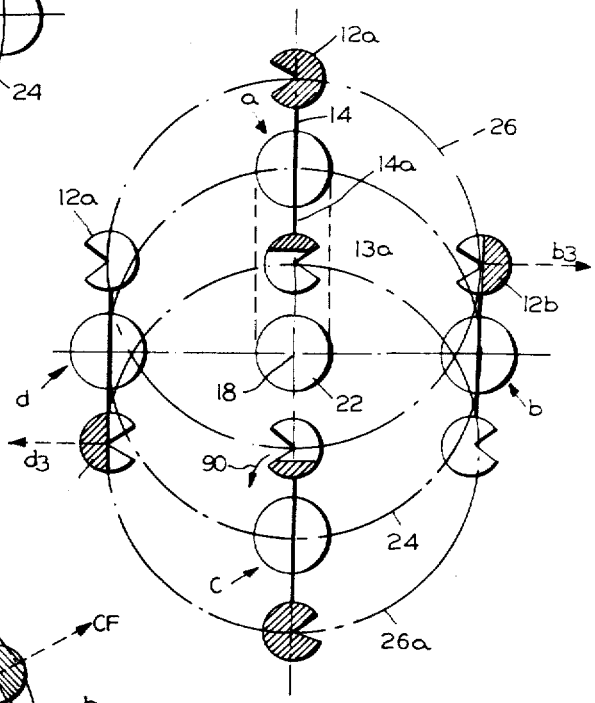
FIGURE 4 shows diagrammatically in end elevation the arrangement of a pair of containers provided symmetrically disposed about the planet wheel axis.

Referring to FIGURE 4 there is shown a further development of the arrangement shown in FIGURES 2 and 3 in that the planet wheel is provided with a further container 13*a* on an opposing arm 14*a* to balance the container 12*a* and arm 14. In FIGURE 4 the planet wheel with containers is shown also in the four positions (*a*), (*b*), (*c*) and (*d*). When the sun wheel is stationary and does not rotate about the second axis 18 the position as shown in FIGURE 4 will obtain, namely the containers 12*a* will orbit along orbit 26 and the container 13*a* will orbit along 26*a*, the orbits being circular. As can be seen from this figure, the containers 12*a* and 13*a* balance each other about the planet wheel axis and the maximum positive turning moment of filled container 12*a* at position (*b*) is assisted by the maximum positive turning moment of filled container 13*a* at position (*d*), the effective torque being proportional to the centrifugal forces *b*3, and *d*3, acting on the liquid massed in the containers.

Figure 5:
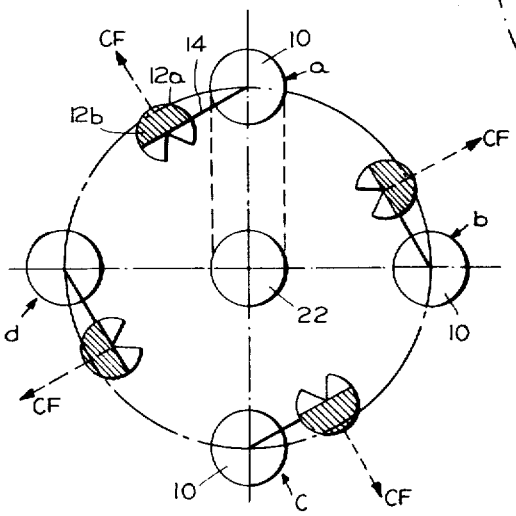
FIGURE 5 shows diagrammatically in end elevation the disposition of a container relative to the sun wheel axis when the drive is direct between carrier and sun wheel.

In the aforegoing description relating to FIGURES 1, 2, 3, and 4 the position was considered when the sun wheel was stationary and was not turning about its axis. As soon as the sun wheel starts to turn, the mass 12 or the containers 12*a* and 13*a*, will no longer describe truly circular orbits but will be arcuately displaced about the planet wheel axis until again arrested by the drag on the sun wheel. When finally the sun wheel rotates at the same speed as the carrier then the position of equilibrium is reached as shown in FIGURE 5 in which the moment exerted by the centrifugal force CF on the liquid in container 12*a* about the planet wheel axis is sufficient to overcome the resisting torque or drag on the sun wheel.

In the description relating to FIGURES 1, 2, 3, 4, and 5 the ratio of the numbers of teeth between planet wheel and sun wheel were considered as unity. This, of course, need not necessarily be so. The intermediate drive means employed between the planet wheel and the sun wheel will ensure that the centrifugal force on the mass 12 and exerting a turning moment on the planet wheel about the planet wheel axis will be predominantly due to the rotation of the carrier about the second axis and that this centrifugal force will not be nullified by the centrifugal force on the mass due to rotation about the planet wheel axis. Planet wheel and sun wheel tooth ratios are also so chosen that this does not take place.

Figure 6:
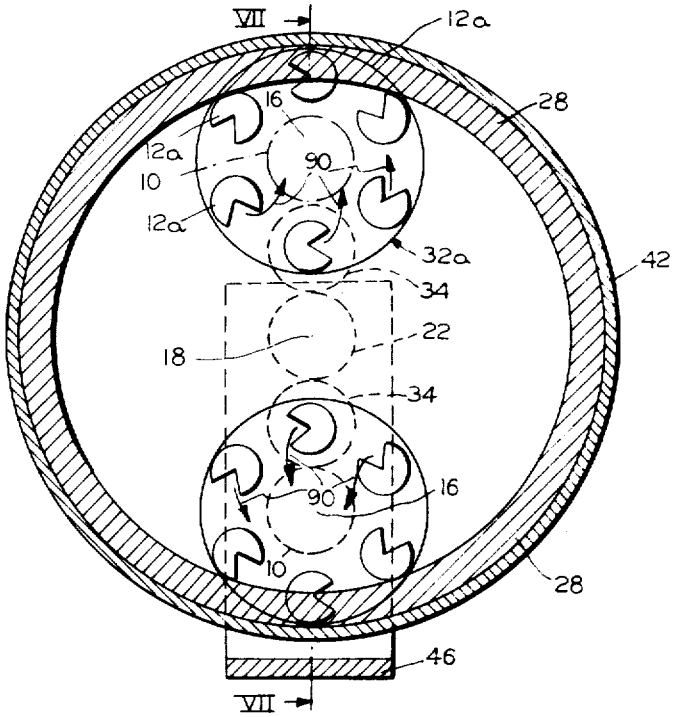
FIGURE 6 shows diagrammatically in sectional end elevation along VI—VI, the arrangement of a number of containers provided around a pair of symmetrically disposed planet wheels within a drum.
Figure 7:
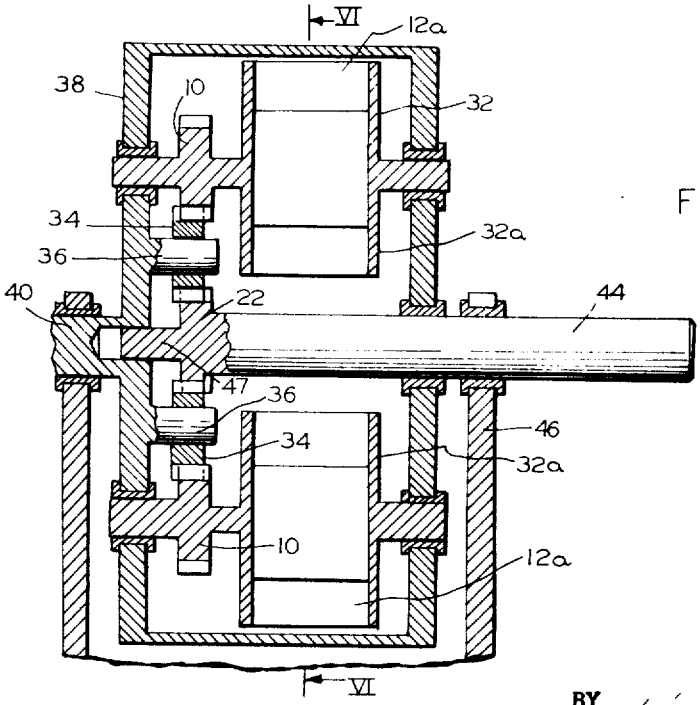
FIGURE 7 shows diagrammatically a sectional side elevation along VII—VII and corresponding to FIGURE 6.

The principles described with reference to FIGURES 1, 2, 3, 4 and 5 are developed further and may be described with reference to FIGURES 6 and 7 in which a plurality of containers 12*a* are attached to each of the planet wheels 10 by means of spiders 32. The intermediate drive means in this embodiment shown, that is in FIGURES 6 and 7, includes idler wheels 34 mounted to rotate about pins 36 fixed to carrier 38 which is attached to input shaft 40. Fixed to or integral with carrier 38 is drum 42 around spiders 32 and containers 12*a* and planet wheels 10 and so on. The idlers 34 are in mesh with sun wheel 22 integral with output shaft 44. The whole arrangement is rotatably supported about the second axis, that is about the axis of the coaxial input shaft 40 and output shaft 44, in a frame 46, the one end 47 of the output shaft being rotatably supported in the carrier. *The fluid is rejected out of the containers 12a through the openings 12c outwardly from the central region of the carrier relative to the drum, in the direction of arrows 90 towards the peripheral layer of liquid 28. (See also FIGURE 4.) The rejection of liquid takes place under the action of centrifugal force, and in passing towards the peripheral layer, the liquid passes transversely through the container wheels 32a.*

Figure 8:
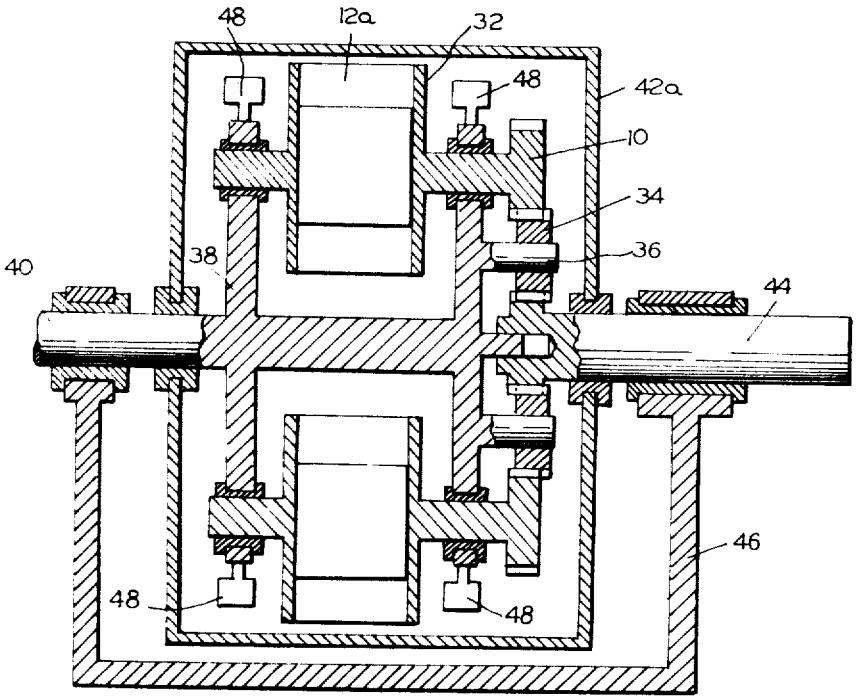
FIGURE 8 shows diagrammatically a sectional side elevation of an embodiment similar to that shown in FIGURE 7 but having a drum freely rotatable about the second axis.

In operation, oil in the drum 42 is whirled around so that under the action of centrifugal force it forms a layer 28 within the drum (see FIGURE 3), input power being applied to input shaft 40. The peripheral speed of the oil is greater than that of the containers 12*a* and thus the oil impinges upon the containers and imparts a force to them which is transmitted as a positive moment onto the sun wheel. This moment is quite apart from the moment applied to the planet wheel about its axis 16 by the mass of liquid within the containers 12*a* under the action of centrifugal force acting on the mass of liquids due to the rotation of the carrier 38 about the second axis 18. The difference in speed between the containers 12*a* and the liquid 28, apart from exerting a positive moment on the output shaft, also results in heat development. If this heat development is not desired, then this embodiment of the invention may be suitably modified as shown in FIGURE 8 in which a drum 42*a* is provided instead of drum 42 and is not connected to the carrier but is mounted around the carrier and containers, to be freely rotatable about the second axis. In such an arrangement, the drum rotates freely, driven by the frictional drag of the rotating liquid within the drum, the liquid being caused to rotate by the passage of the containers 12*a* through it. Of course, if desired, vanes 48 may be provided, attached to the carrier 38 and adapted to whirl the oil around within the drum against the inner surface of the drum.

Figure 9:
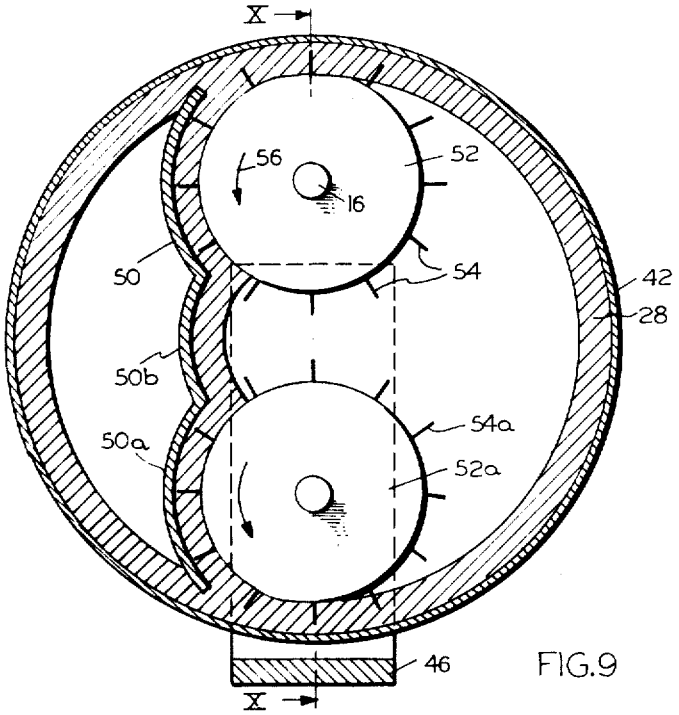
FIGURE 9 shows diagrammatically along X—X a sectional end elevation of a further embodiment of the invention having a vane wheel.
Figure 10:
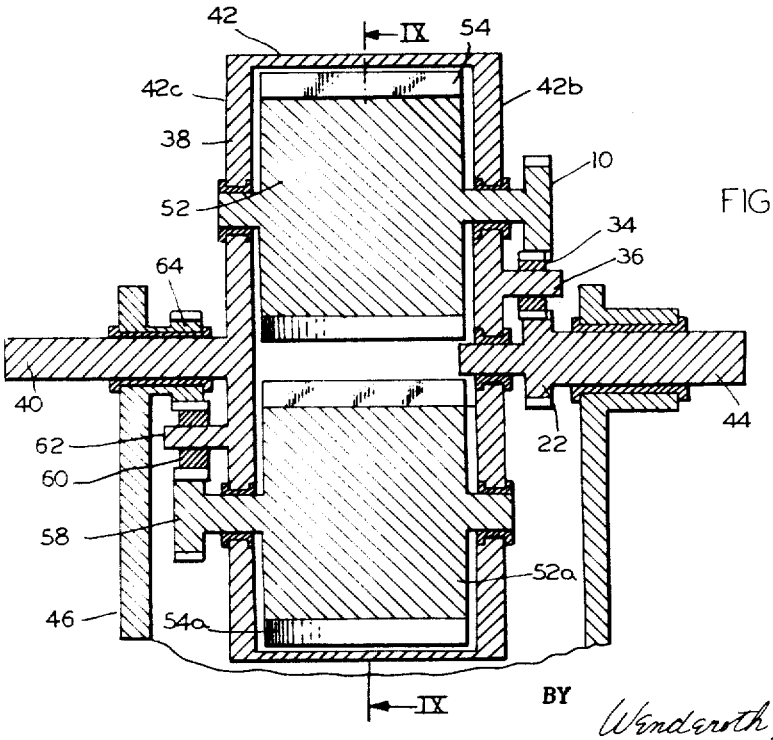
FIGURE 10 shows diagrammatically along IX—IX a sectional side elevation corresponding to FIGURE 9.

Referring now to FIGURES 9 and 10 there is provided a drum 42 comprising the carrier 38 and a shroud defined by drum end walls [42a] *42c* and 42*b*, and shroud wall 50. Within the drum there is provided a vane wheel 52 fast with the planet wheel 10, and adapted to rotate about the planet wheel axis 16 within the shroud. The vane wheel 52 has radially projecting vanes 54.

In operation rotation of the carrier by a rotary power input causes liquid in the drum to be thrown out against the inner surface of the drum 42 in a layer 28. When the sun wheel 22 is stationary the rotation of the carrier in a positive direction causes the planet wheel 10 to be driven to rotate about its axis 16 in a negative direction by idler wheel 34 mounted to rotate about pin 36 fixed to the carrier 38. This rotation of the planet wheel causes the vane wheel 52 to rotate in the direction of arrow 56 and in so doing displaces liquid against the action of centrifugal force towards the central region of the drum. This centrifugal force exercises a positive moment on the vane wheel about the planet wheel axis which is thereupon transferred to the idler 34 and thence onto the sun wheel 22. At full speed running, that is when the output shaft rotates at the same speed as the carrier then the vane wheel will be substantially stationary in relation to the carrier but will move only slightly relative to the carrier, to make up the liquid between vanes and shroud, which may leak out during operation. The vane wheel will therefore have the continual tendency of making up the liquid leaking past the vanes, and therefore it may occur in this embodiment of the invention that the output shaft rotates at a slightly less speed than the carrier when full input torque is being transmitted to the output shaft.

The vane wheel in displacing liquid towards the central region of the drum against the action of centrifugal force, does work and if not recovered will be lost by merely being flung outward under the action of centrifugal force towards liquid layer 28 along the inner surface of the drum 42. This work may be recovered by causing the liquid delivered toward the central region of the drum, to impinge upon the vanes of a servant wheel provided, in being flung outwards toward the outer layer of liquid. The outward flow of the liquid is guided *by wall 50b* onto the vanes 54*a* of the servant wheel 52*a* by means of extension 50*a* to wall 50. The servant wheel 52*a* is mounted to rotate about an axis in the carrier and is provided with abutment means between the frame and the axis of the servant wheel, to permit of the torque generated on the servant vane wheel by the impinging liquid to exert a turning moment on the carrier about the second axis and in the direction of drive to the carrier.

In FIGURE 10 the abutment means is shown to include a gear train having a gear wheel 58 fixed to the servant vane wheel 52*a* and in mesh with an idler 60 mounted to rotate about a pin 62 attached to the carrier 38, the idler 60 in its turn being in mesh with a sun wheel 64 provided coaxially with the second axis and fixed to the frame 46. An alternative arrangement of abutment means may include a chain and sprocket arrangement having a sprocket fixed to the servant vane wheel 52*a* and a sprocket coaxial with the second axis and fixed to the frame 46, both sprockets being engageable by the chain. A yet further alternative arrangement of abutment means, may include a connecting rod pivotally mounted in the vane wheel 52*a* and in frame 46 the pivotal axes being parallel to the rotational axis of the servant vane wheel 52 and the second axis 18. The eccentricity of the pivotal axes of the connecting rod is such that the longitudinal axis of the connecting rod is always parallel to the plane containing the second axis and the pivotal axis of the servant vane wheel 52*a*.

Figure 11:
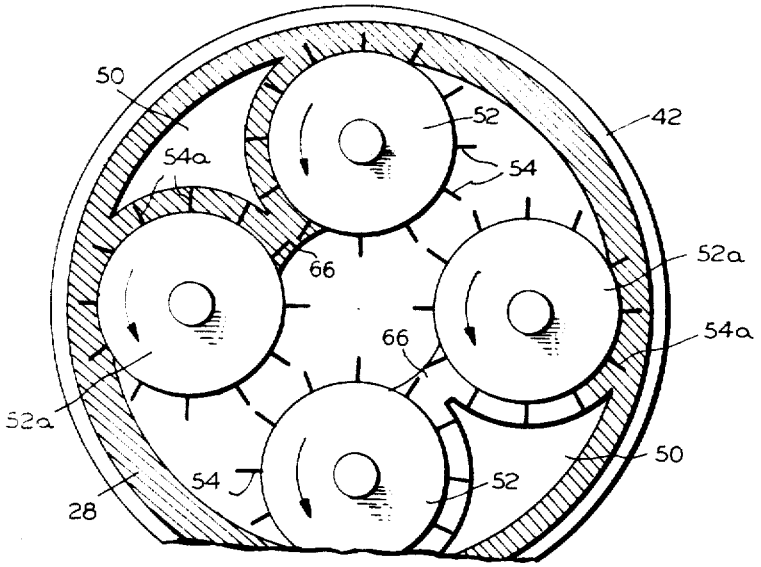
FIGURE 11 shows diagrammatically a sectional end elevation of a further development of the embodiment shown in FIGURES 9 and 10.

FIGURE 11 shows a further development of the embodiment shown in FIGURES 9 and 10 and shows two vane wheels 52 provided and oppositely disposed, each arranged to deliver liquid into the pockets 66, whence the liquid is adapted to flow outwardly under the action of centrifugal force and to impinge against the vanes 54*a* of servant wheels 52*a*.

Instead of providing a single toothed-gear idler or an odd number of such idlers between sun and planet wheels, there may be provided a chain connecting sprocket planet and sun wheels, or where a ratio of unity between sun and planet wheels is permissible a connecting rod may be provided, pivotally mounted in the sun and planet wheels and such that its longitudinal axis at all times is parallel to a line joining the centres of the planet and sunwheels.

I claim:

[1. A torque transmitter comprising a carrier, at least one planet wheel mounted in the carrier to rotate about its own axis, a drum around the carrier and coaxial with the carrier and a second axis, the carrier and drum being mounted to rotate about the second axis, drive connecting means connected to said carrier for connecting the carrier to a source of rotary power, a sun wheel coaxial with the second axis, connecting means connected to the sun wheel for connecting the sun wheel to a load to absorb rotary power, intermediate drive means drivingly connecting the planet wheel with the sun wheel and applying torque developed about the axis of said planet wheel in the same direction about the second axis, a plurality of liquid entrapping means fast with the planet wheel and defining recesses spaced circumferentially away from and around the planet wheel axis, whereby when a quantity of liquid is placed in the drum and said carrier and said drum are rotated, the liquid is flung out in an annular layer against the inner peripheral surface of the drum under the action of centrifugal force, and whereby when the planet wheel rotates about its axis, the liquid entrapping means pass through the annular layer of liquid and entrap liquid in the recesses and displace the entrapped liquid inwardly away from the periphery of the drum in a direction towards the second axis, and after displacement reject such displaced liquid under the action of centrifugal force in a direction outwardly towards the annular layer.]

[2. A torque transmitter comprising a carrier, at least one planet wheel rotatably mounted in the carried for rotation about its own axis, a frame in which the carrier is mounted to rotate about a second axis parallel to the planet wheel axis, a drum around the carrier and coaxial with its rotational axis, drive connecting means connecting to said carrier for connecting the carrier to a source of rotary power, a sun wheel coaxial with the second axis, connecting means connected to said sun wheel for connecting the sun wheel to a load to absorb rotary power, intermediate drive means drivingly connecting the planet wheel with the sun wheel and applying torque developed about the planet wheel axis in the same direction about the second axis, a plurality of outwardly projecting vanes fast with the planet wheel and spaced circumferentially about the planet wheel axis, a shroud fast with the carrier and extending around the ends and sides of the vanes at a position trailing the planet wheel relative to the direction of rotation of the carrier about the second axis, whereby, when a quantity of liquid is placed in the drum and the carrier and drum are rotated, the liquid is flung out in an annular layer against the inner peripheral surface of the drum under the action of centrifugal force, and whereby the vanes during rotation of the planet wheel about its axis dip into the layer of flung out liquid and entrap liquid between them and the shroud and displace such entrapped liquid inwardly away from the periphery of the drum in a direction towards the second axis; and in which there are provided at least one servant wheel mounted in the carrier to rotate about its own axis parallel to the second axis, outwardly extending vanes fast with the servant wheel, an anchor sun wheel coaxial with the second axis and fast with the frame, driving means drivingly connecting the servant wheel and anchor sun wheel and applying torque developed about the servant container wheel axis in the same direction about the anchor sun wheel axis, a shroud fast with the carrier and extending around the ends and sides of the vanes at a position leading the planet wheel relative to the direction of rotation of the carrier about the second axis, whereby liquid displaced inwardly by the vanes of the planet wheel is received onto the vanes of the servant wheel, the liquid being displaced outwardly to the annular layer under the action of centrifugal force and exerting a turning moment on the servant wheel about its axis, which turning moment is transmitted to the carrier via the driving means and anchor sun wheel.]

[3. A torque transmitter comprising a carrier, at least one planet wheel mounted in the carrier to rotate about its own axis, a drum around the carrier and coaxial with the carrier and a second axis, the carrier and drum being mounted to rotate about the second axis, drive connecting means connected to said carrier for connecting the carrier to a source of rotary power, a sun wheel coaxial with the second axis, connecting means connected to the sun wheel for connecting the sun wheel to a load to absorb rotary power, intermediate drive means drivingly connecting the planet wheel with the sun wheel and applying torque developed about the axis of said planet wheel in the same direction about the second axis, a plurality of outwardly projecting vanes fast with the planet wheel and spaced circumferentially about the planet wheel axis, a shroud fast with the carrier and extending around the ends and sides of the vanes at a position trailing the planet wheel relative to the direction of rotation of the carrier about the second axis, whereby when a quantity of liquid is placed in the drum, and said carrier and said drum are rotated, the liquid is flung out in an annular layer against the inner peripheral surface of the drum under the action of centrifugal force, and whereby when the planet wheel rotates about its axis, the vanes pass through the annular layer of liquid and entrap liquid between them and the shroud and displace such entrapped liquid inwardly away from the periphery of the drum in a direction towards the second axis, and after displacement reject such displaced liquid under the action of centrifugal force in a direction outwardly towards the annular layer.]

[4. A torque transmitter according to claim 1 in which the planet and sun wheels are toothed gear wheels and in which the intermediate drive means comprises a toothed idler wheel and a pin on the carrier on which the idler wheel is rotatably mounted in mesh with the planet and sun wheels.]

[5. A torque transmitter according to claim 1 in which there is provided a plurality of planet wheels rotatably mounted in dynamic balance about the second axis, and in which the axes of the planet wheels are parallel to the second axis.]

[6. A torque transmitter according to claim 1 in which the planet and sun wheels comprise chain sprockets and in which the intermediate drive means comprises a drive chain in mesh with the sprockets.]

[7. A torque transmitter according to claim 1 in which the drum is fast with and coaxial with the carrier.]

[8. A torque transmiter according to claim 1 in which the drum is freely rotatably mounted about the second axis.]

[9. A torque transmitter according to claim 8 in which there are provided circumferentially spaced outwardly projecting vanes mounted on the carrier and having an overall radius of the same order as the maximum distance between containers and the said second axis.]

[10. A torque transmitter according to claim 2 in which the drum is secured to and coaxial with the carrier.]

[11. A torque transmitter according to claim 2 in which the drum is freely rotatably mounted for rotation about the main axis.]

[12. A torque transmitter according to claim 11 in which there are provided circumferentially spaced outwardly projecting vanes mounted on the carrier and having an overall radius of the same order as the maximum distance between containers and main axis.]

[13. A torque transmitter according to claim 2 in which the servant and anchor sun wheel are toothed gear wheels and in which the driving means comprises a toothed idler wheel, and a pin on the carrier on which the idler wheel is mounted in mesh with the planet and sun wheels.]

[14. A torque transmiter according to claim 2 in which the servant and anchor sun wheels comprise chain sprockets and in which the driving means comprises a drive chain in mesh with the sprockets.]

[15. A torque transmitter according to claim 1 in which the liquid entrapping means comprise containers spaced away from the planet wheel axis and having openings directed in one direction about the planet wheel axis.]

*16. A torque transmitter, including a carrier having an axis of rotation; a drum adapted to contain a quantity of liquid maintained in a peripheral layer under the influence of centrifugal force, the drum being around the carrier and coaxial with the carrier and the carrier and the drum being mounted to rotate about the carrier axis; drive connected means connected to the carrier for connecting the carrier to a source of rotary power; a sun wheel coaxial with the carrier axis and rotatably mounted relative to the carrier; connecting means connected to the sun wheel for connecting it to a load to absorb rotary power; intermediate drive means drivingly connected to the sun wheel; and torque-developing means mounted on the carrier and including a plurality of planet wheels mounted on the carrier and adapted to rotate about their own axes, the planet wheels being drivingly connected to the intermediate drive means for applying torque developed about the axis of the planet wheel to the sun wheel in the same direction about the sun wheel axis, each of the planet wheels having a plurality of liquid-entrapping means spaced apart circumferentially from each other and radially away from the planet wheel axis to form a liquid-entrapping wheel, the central portion of said wheel radially inwardly of said liquid-entrapping means being open in the diametral direction, the liquid-entrapping means being adapted to entrap liquid from the peripheral liquid layer and being adapted to displace the entrapped liquid inwardly away from the peripheral layer in a direction towards the carrier axis, the spaces between said liquid entrapping means constituting openings so positioned as to facilitate, after such displacement and under the influence of centrifugal force, the rejection of such displaced liquid in a direction towards the peripheral liquid layer through the liquid-entrapping wheel.*

*17. A torque transmitter according to claim 16, in which the liquid-entrapping means are in the form of containers spaced circumferentially apart about the planet wheel axis, the said openings which are positioned to facilitate rejection of entrapped fluid after displacement being defined between adjacent containers and being directed radially inwardly.*

*18. A torque transmitter according to claim 16, in which the planet wheel and sun wheels are toothed gear wheels, and in which the intermediate drive means comprises a toothed idler gear wheel rotatably mounted on the carrier and being in mesh with the planet wheel and sun wheel.*

*19. A torque transmitter according to claim 16, in which the planet wheel and sun wheel are chain sprockets and in which the intermediate drive means comprises a drive chain in mesh with the sprockets.*

*20. A torque transmitter according to claim 16, in which the planet wheels and associated liquid-entrapping means are mounted in dynamic balance about the carrier*

*axis, and in which the axes of the planet wheels are parallel to the carrier axis.*

*21. A torque transmitter according to claim 16, in which the drum is fast with the carrier.*

*22. A torque transmitter according to claim 16, in which the drum is freely rotatable about the carrier axis.*

*23. A torque transmitter according to claim 17, in which the containers have openings directed in one direction about the planet wheel axis.*

*24. A torque transmitter comprising a carrier, at least one planet wheel mounted in the carrier to rotate about its own axis, a drum around the carrier and coaxial with the carrier and a second axis, the carrier and drum being mounted to rotate about the second axis, drive connecting means connected to said carrier for connecting the carrier to a source of rotary power, a sun wheel coaxial with the second axis, connecting means connected to the sun wheel for connecting the sun wheel to a load to absorb rotary power, intermediate drive means drivingly connecting the planet wheel with the sun wheel and applying torque developed about the axis of said planet wheel in the same direction about the second axis, a pluarlity of outwardly projecting vanes fast with the planet wheel and spaced circumferentially about the planet wheel axis, a shroud fast with the carrier and extending around the ends and sides of the vanes at a position trailing the planet wheel relative to the direction of rotation of the carrier about the second axis, whereby when a quantity of liquid is placed in the drum, and said carrier and said drum are rotated, the liquid is flung out in an annular layer against the inner peripheral surface of the drum under the action of centrifugal force, and whereby when the planet wheel rotates about its axis, the vanes pass through the annular layer of liquid and entrap liquid between them and the shroud and displace such entrapped liquid inwardly away from the periphery of the drum in a direction towards the second axis, and after displacement reject such displaced liquid under the action of centrifugal force in a direction outwardly towards the annular layer.*

*25. A torque transmitter according to claim 24, in which the planet wheel and sun wheels are toothed gear wheels, and in which the intermediate drive means comprises a toothed idler gear wheel, rotatably mounted on the carrier and being in mesh with the planet wheel and sun whel.*

*26. A torque transmitter according to claim 24, in which the planet wheel and sun wheel are chain sprockets, and in which the intermediate drive means comprises a drive chain in mesh with the sprockets.*

*27. A torque transmitter according to claim 24, in which the planet wheels and associated liquid-entrapping means are mounted in dynamic balance about the carrier axis, and in which the axes of the planet wheels are parallel to the carrier axis.*

*28. A torque transmitter according to claim 24, in which the drum is fast with the carrier.*

*29. A torque transmitter according to claim 24, in which the drum if freely rotatable about the carrier axis.*

References Cited

The following references, cited by the Examiner, are of record in the patented file of this patent or the original patent.

UNITED STATES PATENTS

| | | | |
|---|---|---|---|
| 1,691,610 | 11/1928 | Reece et al. | 74—752 |
| 1,866,002 | 7/1932 | Anderson | 74—774 |
| 2,293,547 | 8/1942 | Hobbs | —74—774 X |
| 1,546,405 | 7/1925 | Reece | 74—752 |
| 1,666,152 | 4/1928 | Etrigl | 74—774 |
| 1,691,612 | 11/1928 | Reece et al. | 74—752 |
| 1,717,466 | 6/1929 | Reece et al. | 74—752 |
| 1,812,176 | 6/1931 | Sheridan | 74—752 |
| 1,933,143 | 10/1933 | Janssen | 74—752 |
| 2,179,405 | 11/1939 | Falco | 74—752 |
| 2,565,551 | 8/1951 | Dougherty | 74—774 |

FOREIGN PATENTS

| | | |
|---|---|---|
| 1,044,416 | 6/1953 | France. |
| 502,346 | 3/1939 | Great Britain. |
| 762,873 | 12/1956 | Great Britain. |

DONLEY J. STOCKING, *Primary Examiner.*

THOMAS C. PERRY, *Assistant Examiner.*

U.S. Cl. X.R.

74—774